United States Patent [19]
Ellis

[11] 3,989,394
[45] Nov. 2, 1976

[54] STEERING LINKAGE ADJUST RETAINER
[75] Inventor: Carl H. Ellis, Lansing, Mich.
[73] Assignee: General Motors Corporation, Detroit, Mich.
[22] Filed: Oct. 29, 1975
[21] Appl. No.: 626,731

[52] U.S. Cl. .................................. 403/46; 403/320
[51] Int. Cl.² ........................................... F16B 7/00
[58] Field of Search ............... 403/46, 320; 151/29, 151/30

[56] References Cited
UNITED STATES PATENTS

| | | | |
|---|---|---|---|
| 1,039,017 | 9/1912 | Bonness | 403/46 |
| 1,338,862 | 5/1920 | Gorr | 151/29 |
| 1,592,831 | 7/1926 | Lake | 151/29 |
| 2,694,586 | 11/1954 | Smith | 403/46 |
| 3,806,265 | 4/1974 | Hattan | 403/46 |

Primary Examiner—Andrew V. Kundrat
Attorney, Agent, or Firm—Arthur N. Krein

[57] ABSTRACT

The adjuster tube, threaded at opposite ends to an outer tie rod and an inner tie rod in a steering linkage, is provided at one end with anti-rotational means on the exterior thereof including a radial inward extending aperture means and the tie rod at this end has longitudinally extending splined grooves formed on a portion of the threaded end thereof engaged with the adjuster tube. The adjuster retainer is provided with protruding tabs at one end thereof to engage the splines in the tie rod, and is provided at its other end with means to engage the anti-rotational means of the adjuster tube.

4 Claims, 8 Drawing Figures

STEERING LINKAGE ADJUST RETAINER

This invention relates generally to a tie rod assembly for vehicle steering linkage systems and, in particular, to an adjuster retainer arrangement for such a steering linkage system.

Steering linkage tie rod assemblies conventionally employ so-called turn buckle adjustment means in which opposite hand, internal threads are formed on opposite ends of a sleeve member or adjuster tube which threadably engage corresponding threads on associated tie rod elements. Adjustment of the over-all length of such a tie rod assembly is accomplished by rotating the sleeve or adjuster tube in the desired direction in the manner of a turn buckle until the desired length is obtained, after which a suitable locking means is used to prevent further rotation of the sleeve or adjuster tube relative to the tie rods.

In the prior art, this locking means normally took the form of a suitable split ring clamp used in connection with the split ends of the sleeve or adjuster tube, the clamp being used to contract the sleeve or adjuster tube about the rod elements to prevent rotation of these elements relative to each other.

While these split ring clamps are adequate to effect locking of the sleeve or adjuster tube relative to the tie rods, these clamps at both ends of the sleeve or adjuster tube must be loosened sufficiently to permit rotation of the sleeve or adjuster tube relative to the tie rods when it was necessary to effect adjustment of the steering linkage system to obtain the desired degree of wheel toe-in in a vehicle suspension and steering linkage arrangement. Of course, both of these clamp members had to be readily accessible to a mechanic to effect loosening and tightening of these clamp members.

It is therefore the primary object of this invention to provide a steering linkage adjuster retainer for use, for example, in a vehicle steering linkage assembly whereby the adjuster retainer is associated with the adjuster tube and one of the tie rods in such a steering linkage assembly to permit rapid adjustment of these elements and then retention of these adjusted elements.

Another object of this invention is to provide a simple inexpensive adjuster retainer for an adjustable linkage mechanism used in tie rod assemblies for vehicle steering linkage systems.

These and other objects of the invention are obtained in a vehicle steering linkage system having a pair of tie rods connected together by a threaded adjuster tube by means of a retainer, in a preferred embodiment, in the form of a spring clip retainer of U-shaped configuration, with one of the legs of the spring clip being apertured to fit over the end of the adjuster tube in non-rotative locking engagement therewith and the other leg of the retainer being provided with a hole to receive the end of the tie rod associated with this end of the adjuster tube and with protruding tabs to engage into splined grooves in the threaded end of the tie rod to prevent rotation of this tie rod relative to the adjuster tube. In an alternate embodiment, an adjuster retainer is provided at one end with an arcuate flange which is fastened by a threaded fastener to the adjuster tube, the opposite end of this adjuster retainer having a flange extending radially inward from said arcuate flange toward the tie rod so that a tab thereon will engage into a splined groove in the threaded end of the tie rod.

For a better understanding of the invention, as well as other objects and further features thereof, reference is had to the following detailed description of the invention to be read in connection with the accompanying drawings, wherein.

Figure 1:
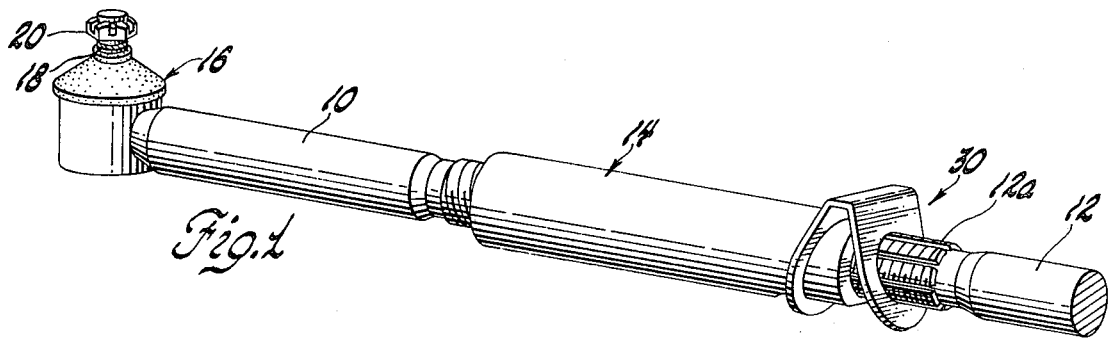
FIG. 1 is a perspective view of a portion of a steering linkage system of a vehicle, the steering linkage system having a steering linkage adjuster retainer in accordance with a preferred embodiment of the invention incorporated therein.

Referring now to FIGS. 1 through 6, inclusive, and in particular to FIG. 1, there is illustrated a tie rod assembly for use in an automotive vehicle steering linkage system which includes an inner tie rod 10 and an outer tie rod 12, each adjustably connected at one end to the other by means of a turn buckle sleeve or adjuster tube 14. The opposite end of each tie rod has the usual ball and socket assembly 16, only the one on the inner tie rod 10 being shown, the ball element of this ball and socket assembly 16 including the usual threaded ball stud 18 on which is threadedly engaged a nut 20 whereby this end of the tie rod can be secured to another element, not shown, of the vehicle steering linkage system.

As is known, the interior peripheral wall of the adjuster tube 14 is provided with internal threads, preferably with right-hand threads 22 in approximately one-half of the tube length, and with opposite hand or left-hand threads 24 in the other axial half of the tube. With this arrangement, the inner tie rod 10 would, in the construction shown, be provided with external right-hand threads 26 at the threaded end thereof for mating engagement with the threads 22 and the outer tie rod 12 would be provided with external left-hand threads 28 whereby this end of the outer tie rod can be threadedly engaged with the threads 24 of the adjuster tube 14. With this arrangement, as adjuster tube 14 is rotated relative to the inner and outer tie rods 10 and 12, respectively, both of these tie rods will move axially inward or outward of the adjuster tube depending on which direction the adjuster tube is rotated. In this type steering linkage system, the inner and outer tie rods 10 and 12, respectively, as installed in a vehicle, would not be free to rotate with respect to each other.

Now in accordance with a preferred embodiment of the invention, this tie rod assembly also includes an adjuster retainer 30 that is used for releasably securing the outer tie rod 12, in the construction shown, against rotation relative to the adjuster tube 14. Adjuster retainer 30, made of spring steel, for example, may be formed as a metal stamping, as shown in FIG. 5, and then bent into a U-shaped configuration, when viewed from the side, as in FIG. 2, to provide first and second legs 31 and 32, respectively, connected together by a base 33, with the free ends of the legs 31 and 32 in an as-bent condition, being further spaced apart than their opposite ends which are integrally secured to the base 33.

Leg 31 of the adjuster retainer 30 is provided with an aperture therethrough of substantially circular configuration having a diameter greater than the outside diameter of the adjuster tube 14, this aperture being defined by a semi-circular edge 31a and a cord portion providing flat edges 31b with a retainer tab 31c extending radially inward therefrom, the edges 31b and retainer tab 31c defining an anti-rotational means to prevent rotation of the adjuster tube 14 relative to the adjuster retainer 30 when these elements are assembled together, in the manner to be described. To effect this, one end of the adjuster tube 14, the outer tie rod end or right-hand end in the embodiment shown, is provided with a flat 14a extending longitudinally from this one end thereof, and a longitudinally extending groove 14b is provided in the surface of flat 14a, both the flat 14a and the groove 14b being formed complementary to the flat edge 31b and retainer tab 31c of the adjuster retainer 30.

Figure 5:
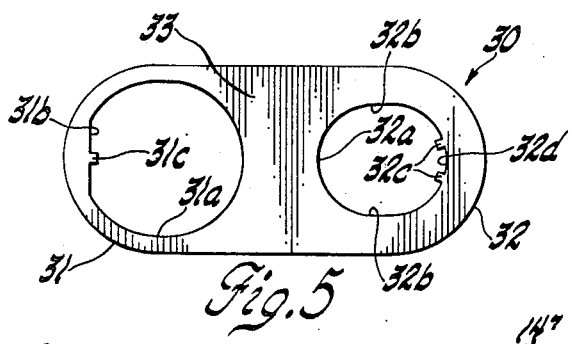
FIG. 5 is a plan view of the adjuster retainer of FIG. 1 shown in an as formed, unsprung condition.
Figure 6:
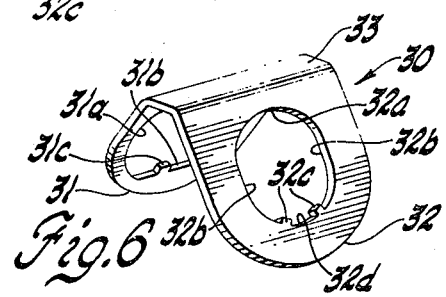
FIG. 6 is a perspective view of the adjuster retainer of FIG. 5 showing it in its bent but relaxed position.

The other leg 32 of the adjuster retainer 30 is also provided with an aperture therethrough of substantially oblong configuration, as best seen in FIGS. 5 and 6, which is defined by a semi-circular edge 32a joining spaced apart arcuate-shaped side edges 32b which in turn join spaced apart radially inward extending tabs 32c, two such tabs being shown in the embodiment illustrated, with an arcuate edge 32d between these tabs 32c. The effective diameter of the aperture forming the semi-circular edge 32a is greater than the major thread diameter of the threads 28 on the end of the outer tie rod 12. The tabs 32c provide means cooperable with means to be defined on the outer tie rod 12 to prevent rotation of the tie rod 12 relative to the adjuster retainer 30 when these elements are assembled together in a manner to be described. For this purpose, a portion of the end of the outer tie rod 12 having the threads 28 thereon is provided with a plurality of longitudinally extending, equally spaced apart grooves 12a, these grooves being referred to as splined grooves. The width and depth of the grooves 12a would, of course, be formed complementary to the tabs 32c.

Figure 2:
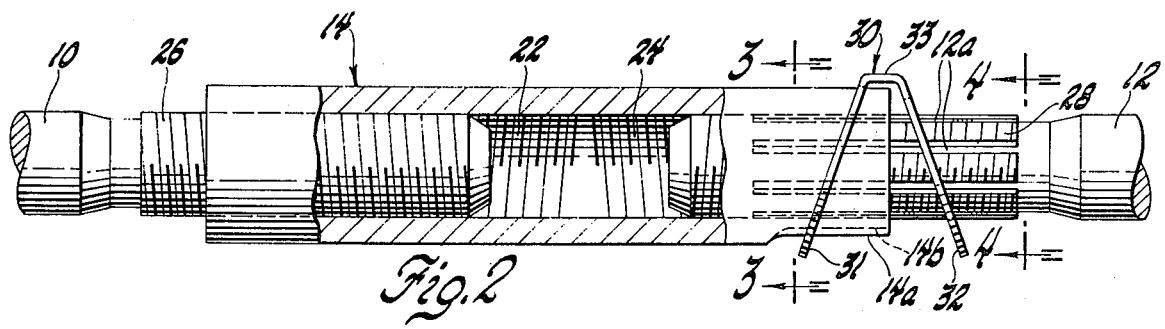
FIG. 2 is a side elevational view, partly broken away, showing the tie rod and adjuster tube with adjuster retainer of FIG. 1.
Figure 3:
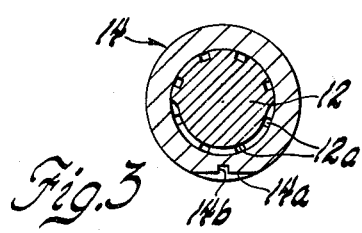
FIG. 3 is a sectional view taken along line 3—3 of FIG. 2.
Figure 4:
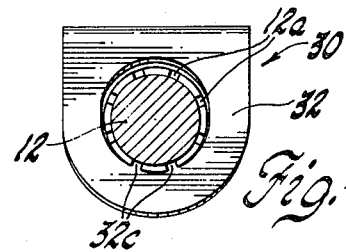
FIG. 4 is a sectional view taken along line 4—4 of FIG. 2.

In order to assemble the outer tie rod 12 to the adjuster tube 14 with the leg 31 of the adjuster retainer 30 encircling the end of the adjuster tube, with the flat edges 31b aligned with the flat 14a and with the retainer tab 31c of this leg engaged into the groove 14b, the open ends of the adjuster retainer are forcibly urged toward one another so as to align the aperture in the leg 32 with the aperture in leg 31 to permit insertion of the threaded 28 end of the outer tie rod 12 to be inserted into this end of the adjuster tube for threaded engagement with the threads 24 thereof. Once the adjuster tube 14 has the desired threaded engagement with both the inner tie rod 10 and outer tie rod 12, pressure is then released from the open end portions of the adjuster retainer 30, which then permits the legs 31 and 32 thereof to return toward the position in which the adjuster retainer is again substantially spread U-shaped, as shown in FIG. 2. Preferably before releasing the legs, the outer tie rod 12 would be rotated relative to the adjuster tube 14 so that a pair of splined grooves therein will be in alignment with the tabs 32c so that upon release of the leg 32, these tabs will enter into the splined grooves to effectively lock the outer tie rod 12 against rotation relative to the adjuster tube 14.

Figure 7:
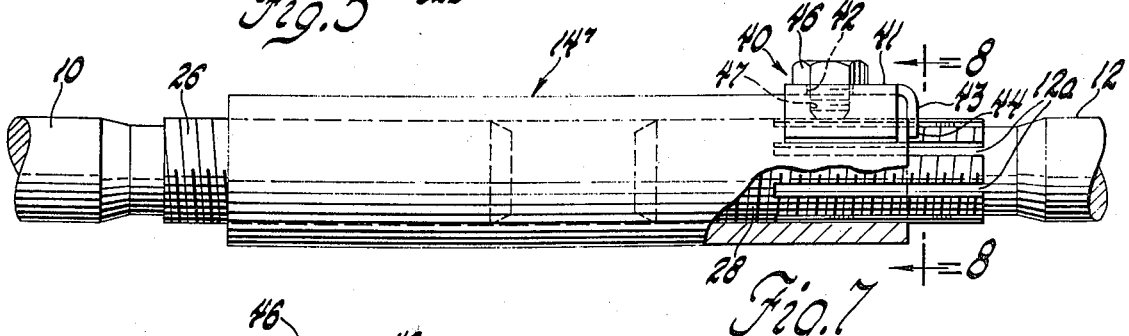
FIG. 7 is a view corresponding to FIG. 2 but showing an alternate embodiment of an adjuster retainer; and, FIG. 8 is a sectional view taken along line 8—8 of FIG. 7.
Figure 8:
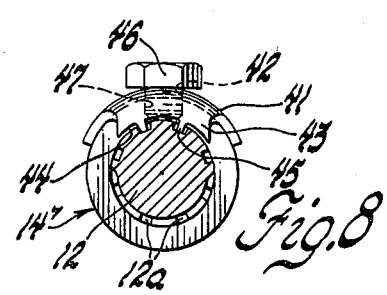

With reference to FIGS. 7 and 8, there is shown an alternate embodiment of an adjuster retainer 40, in accordance with the invention, which is associated with an alternate embodiment of an adjuster tube, designated 14', used to adjustably couple together an inner tie rod 10 and an outer tie rod 12 which are each threadably received at opposite ends of the adjuster tube 14' in the manner previously described with reference to FIGS. 1 and 2. However, in the alternate embodiment, the adjuster tube 14' is provided at one end with a threaded aperture through a wall thereof, for a purpose which will become apparent.

The alternate adjuster retainer 40, as shown, is substantially L-shaped and includes at one end thereof an arcuate-shaped flange 41, the curve of this arcuate flange being shaped complementary to the outer periphery of the adjuster tube 14' so as to partly encircle the outer periphery of the adjuster tube 14' and to extend longitudinally from one end thereof when mounted thereon. Mounting and securement of this flange 41 to the adjuster tube 14' is effected by providing a threaded aperture 47 through a wall of the adjuster tube 14' and by providing the arcuate flange 41 with an aperture 42 therethrough to slidably receive the threaded shank of a headed threaded fastener such as bolt 46, the threads of which are then threadingly received in the threaded aperture 47 in the adjuster tube 14'. Also formed integral with the arcuate flange 41 of the adjuster retainer 40 is a radial bent flange 43 that will project radially inward toward the axis of the adjuster tube 14' when this adjuster retainer 40 is fixed thereto. The free ends of the flange 43 terminate in arcuate edge portions 44 with at least one tab 45 extending radially therefrom, two such tabs 45 being used in the embodiment illustrated in FIGS. 7 and 8, as best seen in FIG. 8. The arcuate edge portions 44 are formed complementary to the outer periphery of the threaded end 28 of the outer tie rod 12 and, of course, the tabs 45 will also be formed complementary to the width and depth of the grooves 12a provided in the threaded end of the outer tie rod 12 whereby these tabs can slidably project radially inward into the grooves 12a to prevent rotation of the outer tie rod 12 relative to the adjuster tube 14' when the adjuster retainer 40 is fixed in its secured position as shown in FIGS. 7 and 8.

It will be apparent that in order to permit rotation of the adjuster tube 14' relative to the inner and outer tie rods 10 and 12, respectively, when the adjuster retainer 40 is mounted on the adjuster tube 14', the bolt 46 must be unthreaded sufficiently from the threaded aperture 47 in the adjuster tube 14' to permit withdrawal of the tabs 45 from the grooves 12a in the threaded end of the outer tie rod 12 so that this tie rod is free for rotation relative to the adjuster tube 14'. After a necessary adjustment is made by rotation of the adjuster tube 14' in the direction to effect either the lengthening or shortening of the effective axial length of this steering linkage assembly, the headed threaded fastener 46 would again be tightened to, in effect, bolt the adjuster retainer 40 to the adjuster tube while at the same time allowing the tabs 45 to engage into the grooves 12a of the outer tie rod 12 thereby effectively locking the outer tie rod against rotation relative to the adjuster tube 14'. In this alternate embodiment, it will be apparent that the headed threaded fastener 46 extending through the aperture in the flange 41 of the adjuster tube for threaded engagement into the threaded aperture 47 of the adjuster tube will prevent rotation of the adjuster retainer 40 relative to the adjuster tube 14' and, of course, the tabs 45 projecting into the grooves 12a of the outer tie rod 12 will prevent relative rotation between these elements. As previously mentioned, if after adjustment the tabs 45 are not in alignment for entrance into the grooves 12a, the adjuster tube 14' need only be rotated a fraction of a turn relative to the outer tie rod 12 to effect the necessary alignment of the tabs with these grooves. The degree of rotation necessary to effect this alignment will, of course, depend on the number and peripheral spacing of the grooves 12a, which may be pre-selected, as desired.

Although in both embodiments of the adjuster retainers shown and described a pair of tabs were used to effect locking engagement of an adjuster retainer into the grooves 12a of the outer tie rod 12, it will be apparent only one such tab need be used, if desired. In addition, as shown, the grooves 12a in the threaded 28 end preferably do not extend the full length of the threads, so that the free threaded end of this tie rod will have a series of continuous threads at the free end thereof for full engagement with the threads 24 of the adjuster tube, but could extend the full length, if desired.

What is claimed is:

1. An adjustable tie rod assembly comprising a tubular sleeve internally threaded at opposite ends, said sleeve having an anti-rotation means thereon including at least a radial extending aperture means adjacent one end thereof and a flat on the exterior of said sleeve adjacent said one end with said aperture means extending radially inward from said flat, a first tie rod, threaded at one end, adjustably received in one end of said sleeve in threaded engagement therewith, a second tie rod, threaded at one end, adjustably received in the opposite end of said sleeve in threaded engagement therewith, said first tie rod having a plurality of axially extending spaced apart spline grooves thereon adjacent said one end, and a retainer means having means at one end thereof engaging said anti-rotation means of said sleeve to prevent rotation of said retainer means relative to said sleeve and having spline engaging tab means at its other end engaging at least one of said spline grooves of said first tie rod to lock said first tie rod against rotation relative to said sleeve, said retainer means being substantially C-shaped and of resilient material, said retainer means having a first arm and a second arm resiliently normally biased away from each other, said first arm having an oblong hole therethrough to receive said first tie rod, said hole providing radially inward extending protruding tab means forming said tab means engaging at least one of said spline grooves of said first tie rod, said second arm having a substantially round hole therethrough with a flat and one protruding tab to encircle said sleeve with said flat aligned with said flat on said sleeve and with said tab engaging said aperture means in said sleeve.

2. An adjustable tie rod assembly comprising a tubular sleeve internally threaded at opposite ends, said sleeve having an anti-rotation means thereon including at least a radial extending aperture means adjacent one end thereof, a first tie rod threaded at one end, adjustably received in one end of said sleeve in threaded engagement therewith, a second tie rod, threaded at one end, adjustably received in the opposite end of said sleeve in threaded engagement therewith, said first tie rod having a plurality of axially extending spaced apart spline grooves thereon adjacent said one end, and a retainer means having means at one end thereof engaging said anti-rotation means of said sleeve to prevent rotation of said retainer means relative to said sleeve and having spline engaging tab means at its other end engaging at least one of said spline grooves of said first tie rod to lock said first tie rod against rotation relative to said sleeve, said retainer means including a semi-circular curved flange extending axially along said sleeve for abutment with the outer periphery of said sleeve, said curved flange having an aperture therethrough, a fastener extending through said aperture in said flange into threaded engagement with said aperture means in said sleeve, said retainer means further including a radial inward extending flange integral with one end of said curved flange, said radial flange having at least one retaining tab at the free end thereof engaging one of said spline grooves in said first tie rod.

3. An adjuster tie rod assembly comprising a tubular adjuster sleeve provided with opposite hand internal threads at opposite ends thereof, the outer peripheral surface of said tubular adjuster sleeve being provided with a flat adjacent to one end of said adjuster sleeve with a radially inward groove extending longitudinally of said flat surface, a first tie rod threaded at one end adjustably received in said one end of said adjuster sleeve in threaded engagement therewith, a second tie rod threaded at one end adjustably received in threaded engagement at the opposite end of said adjuster sleeve, said first tie rod having splined groove means thereon adjacent said one end, and a U-shaped spring adjuster retainer, said adjuster retainer having a first arm and a second arm with an interconnecting web therebetween, the free ends of said first arm and said second arm being normally resiliently biased away from each other, said first arm having an oblong hole therethrough of a nominal size to slidably encircle said one end of said first tie rod, said oblong hole providing an inner peripheral edge with radially inward extending tab means thereon of a configuration complementary to said groove means whereby said tab means when in alignment with said groove means can project into said groove means, said second arm having a substantially circular aperture therethrough defining at a segment thereof a flat edge with a tab projecting radially inward toward the center of said aperture, the nominal diameter of said aperture being such whereby said one end of said tubular sleeve with said flat thereon can be slidably received in said second arm and engaged therewith to prevent rotation relative thereto.

4. An adjuster tie rod assembly for use in a vehicle steering linkage, said adjuster tie rod assembly comprising a tubular adjuster sleeve provided at opposite ends with opposite hand internal threads, one end of said adjuster sleeve being provided with a radially extending threaded aperture through a wall thereof at one end thereof, a first tie rod having a threaded end adjustably received in said one end of said adjuster sleeve in threaded engagement therewith, a second tie rod having a threaded end adjustably received in threaded engagement at the opposite end of said adjuster sleeve, said first tie rod having splined groove means thereon adjacent said threaded end, an L-shaped adjuster retainer, including a curved flange extending axially along said adjuster sleeve, said curved flange having an aperture therethrough, and a bolt means extending through said aperture in said curved flange for threaded engagement with said threaded aperture in said adjuster sleeve, said adjuster retainer further having a radially inward bent flange extending integrally from one end of said curved flange, said radial flange terminating in tab means adapted to engage into said splined groove means of said first tie rod whereby to prevent rotation of said first tie rod relative to said adjuster sleeve when said tab means are engaged in said splined groove means.

\* \* \* \* \*